United States Patent
Wang et al.

(10) Patent No.: US 9,888,693 B2
(45) Date of Patent: Feb. 13, 2018

(54) DUMPLING WRAPPING DEVICE

(71) Applicant: ANKO FOOD MACHINE CO., LTD., New Taipei (TW)

(72) Inventors: Li Hsien Wang, New Taipei (TW); Ge Wei Chao, New Taipei (TW); Sung Yang Chen, New Taipei (TW)

(73) Assignee: ANKO FOOD MACHINE CO., LTD., New Taipei (TW)

( * ) Notice: Subject to any disclaimer, the term of this patent is extended or adjusted under 35 U.S.C. 154(b) by 217 days.

(21) Appl. No.: 14/845,223

(22) Filed: Sep. 3, 2015

(65) Prior Publication Data
US 2017/0064967 A1    Mar. 9, 2017

(51) Int. Cl.
*A21C 9/06* (2006.01)

(52) U.S. Cl.
CPC ..................... *A21C 9/06* (2013.01)

(58) Field of Classification Search
CPC ....... A21C 9/06; A21C 9/063; Y10T 83/6667; Y10T 83/9411
USPC .... 99/353, 355, 450.6, 450.7, 452; 425/112, 425/151, 204, 298; 426/113, 231, 297
See application file for complete search history.

(56) References Cited

U.S. PATENT DOCUMENTS

| | | | | |
|---|---|---|---|---|
| 4,044,661 A | * | 8/1977 | Balaz | A23J 3/227 99/355 |
| 4,160,634 A | * | 7/1979 | Huang | A21C 9/04 425/112 |
| 4,441,408 A | * | 4/1984 | Costa | A21C 3/06 425/112 |
| 5,549,467 A | * | 8/1996 | Schultz | A21C 11/04 425/298 |
| 2012/0219674 A1 | * | 8/2012 | Lee | A21C 9/063 426/283 |

FOREIGN PATENT DOCUMENTS

| | | | |
|---|---|---|---|
| CN | 201160466 | * | 12/2008 |
| CN | 202145825 | * | 2/2012 |
| CN | 204091798 | * | 1/2015 |

* cited by examiner

*Primary Examiner* — Thien S Tran
(74) *Attorney, Agent, or Firm* — Leong C. Lei (57) ABSTRACT

The dumpling wrapping device contains a filling provision member, two wrapping members, and two shaping members. The filling provision member distributes dumpling fillings to feed two production lines of dumplings, each involving a wrapping member and a shaping member. Two pairs of rotors in the filling provision member drives dumpling fillings towards the wrapping members through two tubes. The wrapping members wrap the dumpling fillings from the tubes with dough. The dough wrapped fillings are pressed by the shaping members into dumplings of desired shape and size. Positioning members are configured under the shaping members so that the shaping members can be conveniently replaced and cleaned.

6 Claims, 14 Drawing Sheets

DUMPLING WRAPPING DEVICE

BACKGROUND OF THE INVENTION (a) Technical Field of the Invention

The present invention is generally related to dumpling wrapping, and more particular to a device wrapping fillings in dough skins so as to make dumplings.

(b) Description of the Prior Art

A conventional dumpling wrapping device, as taught by China Patent No. CN204091798 and CN202145825, contains a filling unit, a dough unit, and a shaping unit. The filling unit has a bucket for storing fillings with a mixer inside. The mixed fillings are delivered to the dough unit which produces a tubular dough skins wrapping the fillings. The shaping unit then presses the wrapping fillings with molds into individual dumplings. The conventional dumpling wrapping device has a number of disadvantages.

The conventional dumpling wrapping device provides a single line of production. To increase the yield, additional dumpling wrapping devices have to be deployed. However each dumpling wrapping device requires an operator, and more devices require a same number of operators. The production cost and man power therefore cannot be effective reduced. The power consumption also increases as the number of devices increases.

Sometimes there are larger chunks of fillings in the filling unit and the production process is inevitably disrupted. Usually the fillings are divided into two outputs so that the production process is not affected even though one of the outputs is stopped. However, when actually happens is that, when one output is blocked, fillings will crowd into the other output, again causing blockage or producing dumplings of inferior quality.

Dumplings have different sizes and shapes in various countries and regions. Therefore, to make dumplings of different sizes and shapes, the molds have to be replaced and cleaned, which is laborious and time-consuming. For small-volume-large-variety production, the cost would be greatly increased as the molds have to be frequently replaced. As such, not only the production speed is affected, the man power has to be increased.

SUMMARY OF THE INVENTION

Therefore, to obviate the shortcomings of the prior art, the present invention provides a novel dumpling wrapping device. The dumpling wrapping device contains a filling provision member, two wrapping members, and two shaping members. The filling provision member distributes dumpling fillings to feed two production lines of dumplings, each involving a wrapping member and a shaping member. Two pairs of rotors in the filling provision member drives dumpling fillings towards the wrapping members through two tubes. The wrapping members wrap the dumpling fillings from the tubes with dough. The dough wrapped fillings are pressed by the shaping members into dumplings of desired shape and size. Positioning members are configured under the shaping members so that the shaping members can be conveniently replaced and cleaned.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
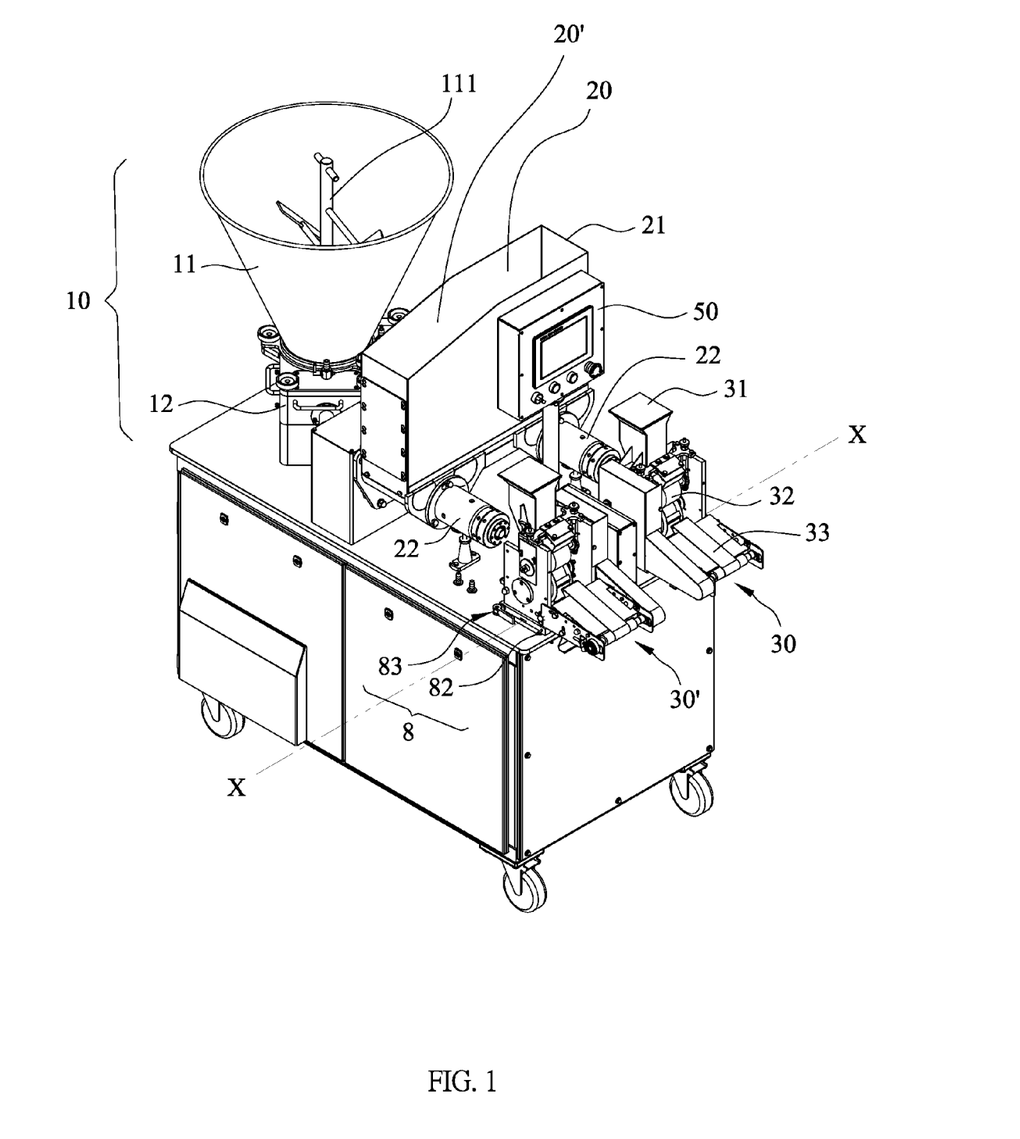
FIG. 1 is a perspective diagram showing a dumpling wrapping device according to an embodiment of the present invention.
Figure 2:
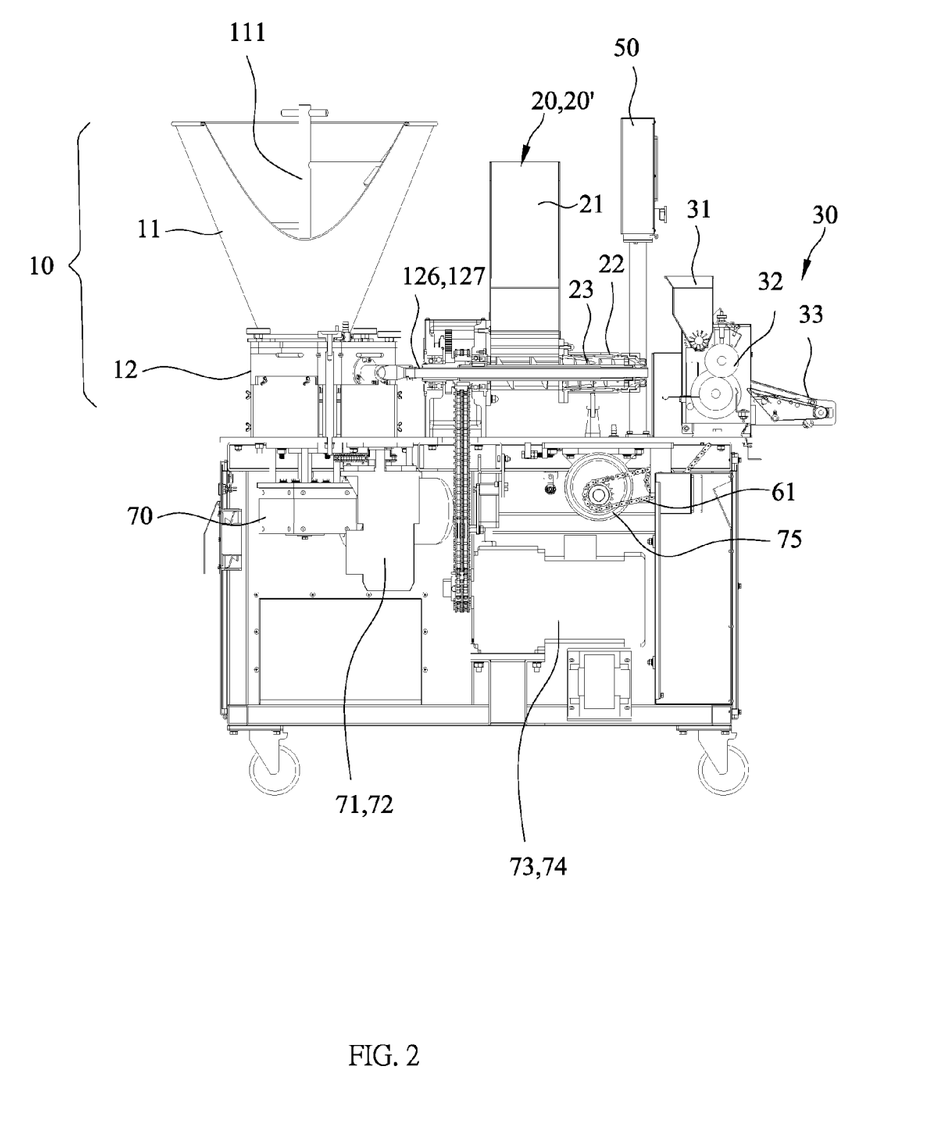
FIG. 2 is a sectional diagram showing the dumpling wrapping device of FIG. 1.

As shown in FIGS. 1 and 2, a dumpling wrapping device according to an embodiment of the present invention contains a filling provision member 10, two wrapping members 20, 20', and two shaping members 30, 30'. The filling provision member 10 distributes its stored dumpling fillings for two production lines of dumplings, each involving a wrapping member 20 or 20', and a shaping member 30 or 30'.

The filling provision member 10 contains a bucket 11 with a mixer 111 inside for storing and mixing dumpling fillings, and a provision box 12 beneath the bucket 11. Inside the provision box 12, a first chamber 121, a second chamber 122, and a third chamber 123 are configured. The mixer 111 has an axle 112 extended into the first chamber 121 and is driven by a power source 70. The second and third chambers 122 and 123 are configured with pairs of rotors 40 and 41, respectively. The axles 401 and 411 of the rotors 40 and 41 are driven by power sources 71 and 72, respectively.

Figure 3:
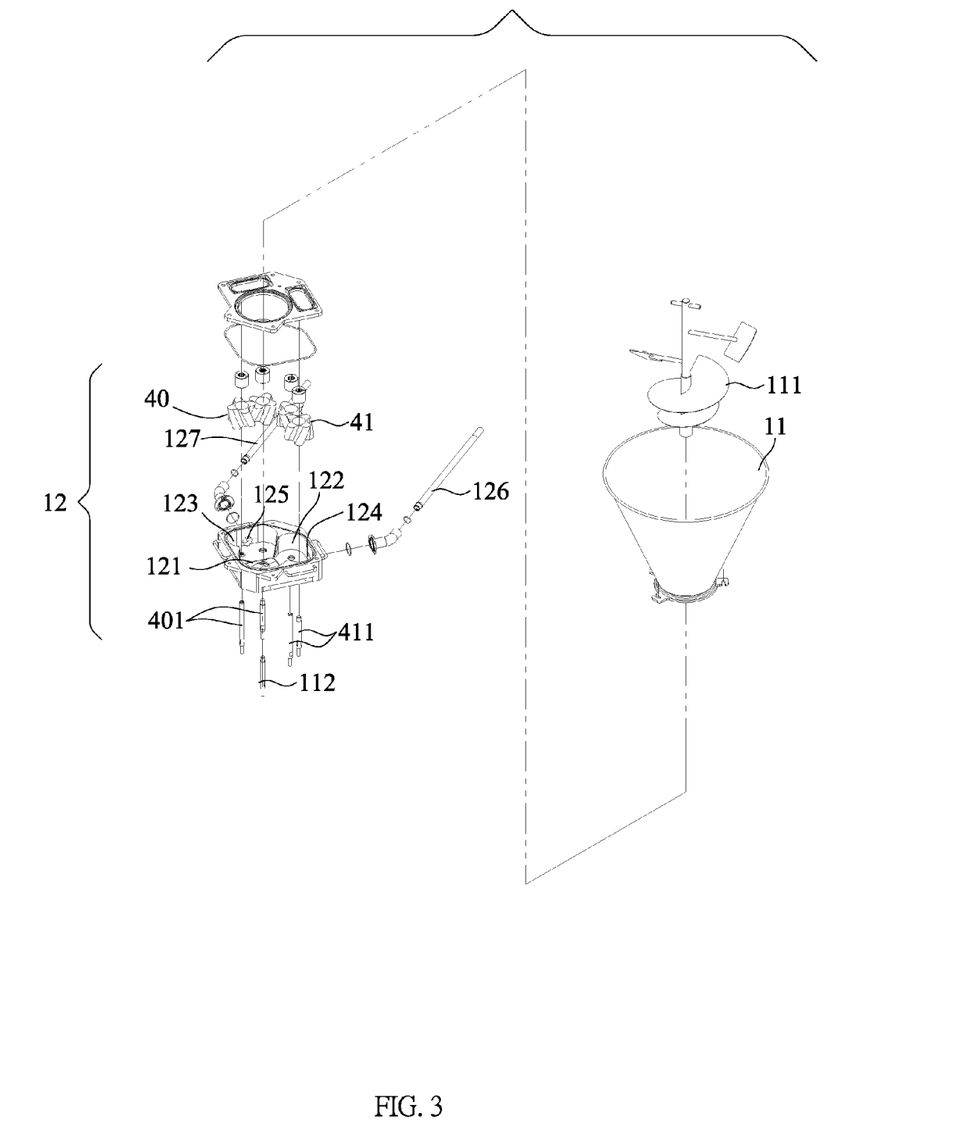
FIG. 3 is a perspective break-down diagram showing a filling provision member of the dumpling wrapping device of FIG. 1.
Figure 4:
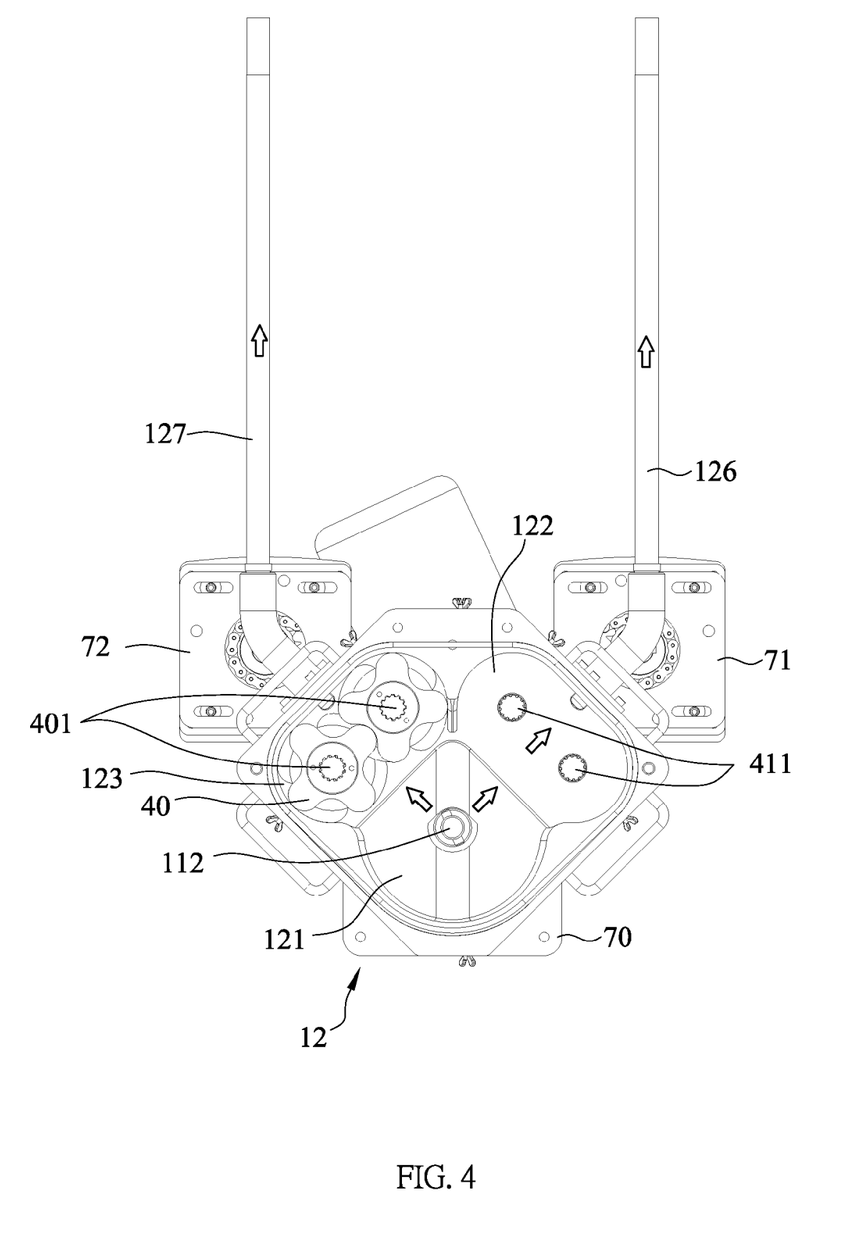
FIG. 4 is a top view diagram showing a provision box of the filling provision member of FIG. 4 where a pair of rotors is removed from a chamber of the provision box.
Figure 11:
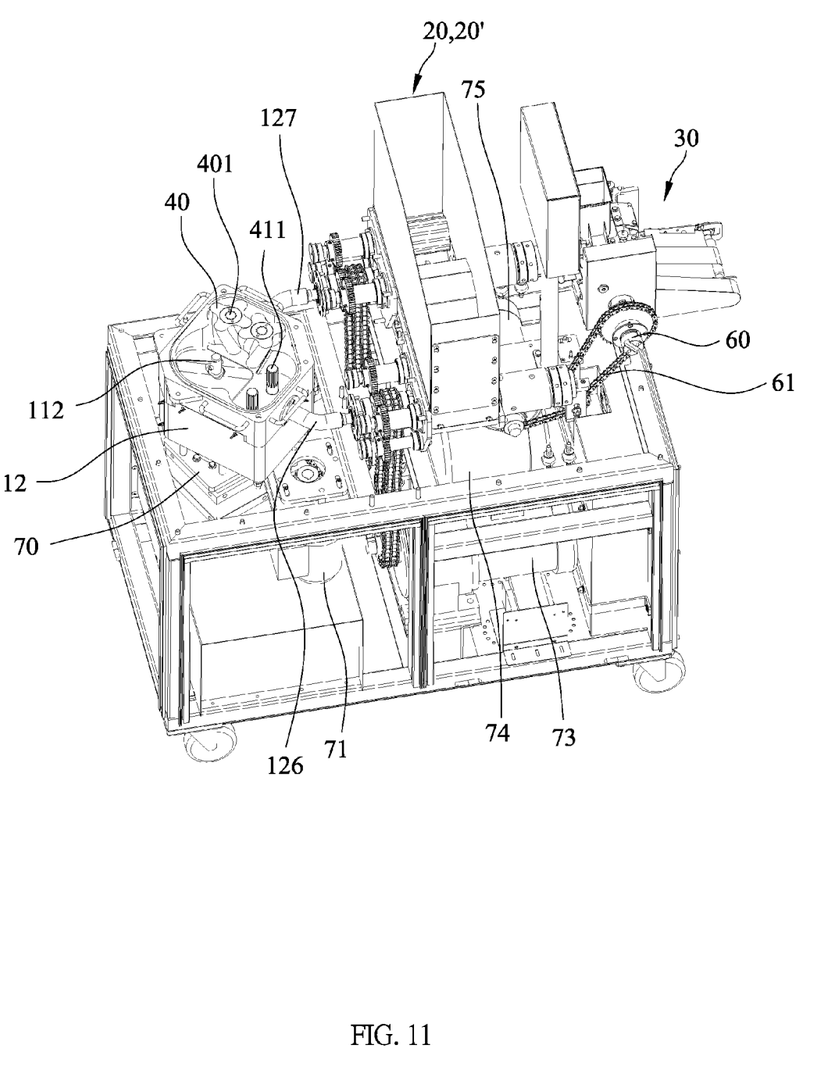
FIG. 11 is a perspective diagram showing the various power sources of the dumpling wrapping device of FIG. 1.

As shown in FIGS. 3, 4, and 11, the first, second, and third chambers 121, 122, and 123 are positioned into a triangular shape where every two of them are adjacent to each other. The second and third chambers 122 and 123 have outlet holes 124 and 125 on a wall opposite to another wall interfacing the first chamber 121, respectively. The outlet holes 124 and 125 are connected to two tube 126 and 127 for transmitting dumpling fillings to the two wrapping members 20 and 20', respectively.

Figure 5:
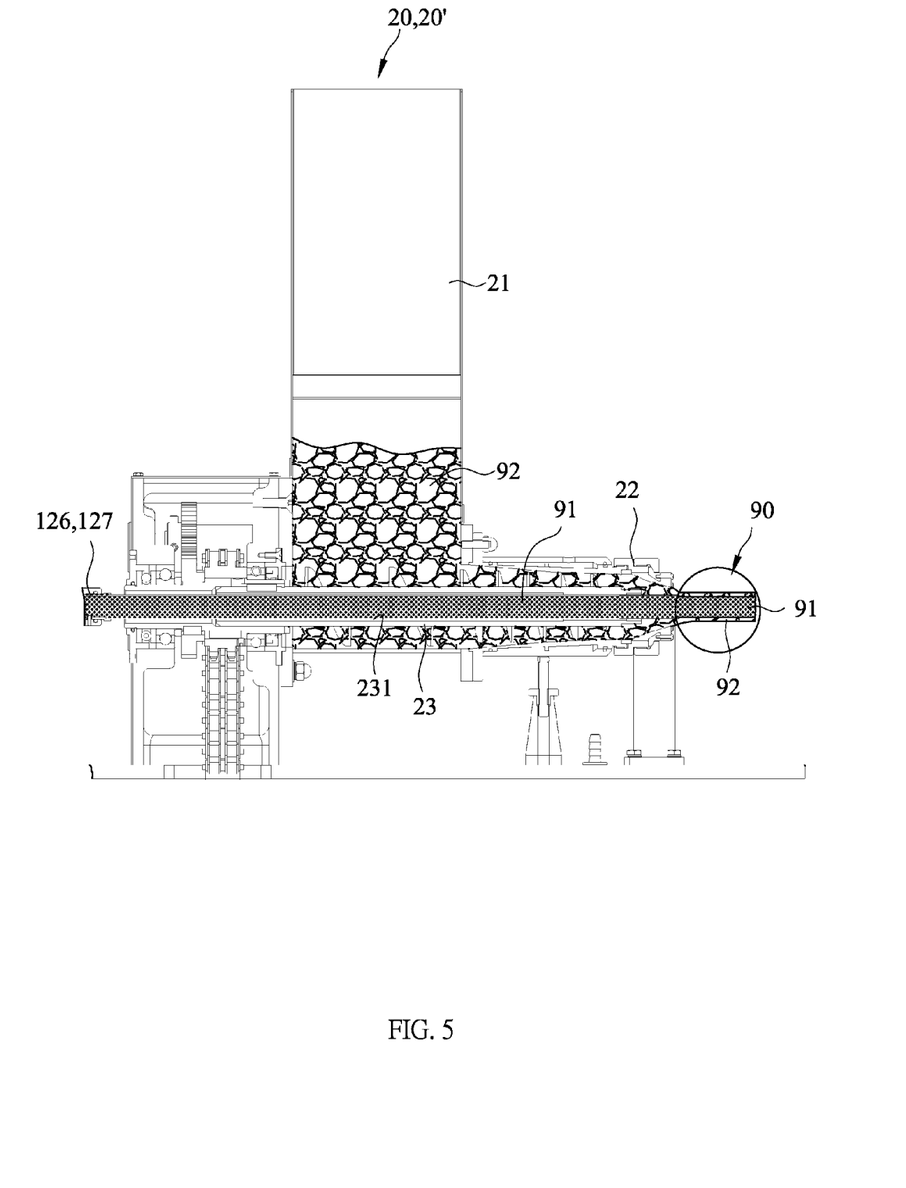
FIG. 5 is a sectional diagram showing a wrapping member of the dumpling wrapping device of FIG. 1.

As shown in FIGS. 1, 2, and 5, the wrapping members 20 and 20' are beneath and connected to a dough barrel 21. Each wrapping member 20 or 20' contains a pipe 22. Each pipe 22 contains a channel 231 connected to one of the tubes 126 or 127. Inside each channel 231, there is a helical shaft 23 driven by a power source 73 or 74. When the helical shaft 23 is rotated by the power source 73 or 74, dumpling fillings 91 from the tube 126 or 127 are moved through the pipe 22 while dough 92 from the dough barrel 21 wraps around the dumpling fillings 91. A tube of fillings 90 wrapped in dough 92 is delivered to one of the shaping members 30 or 30'.

Figure 6:
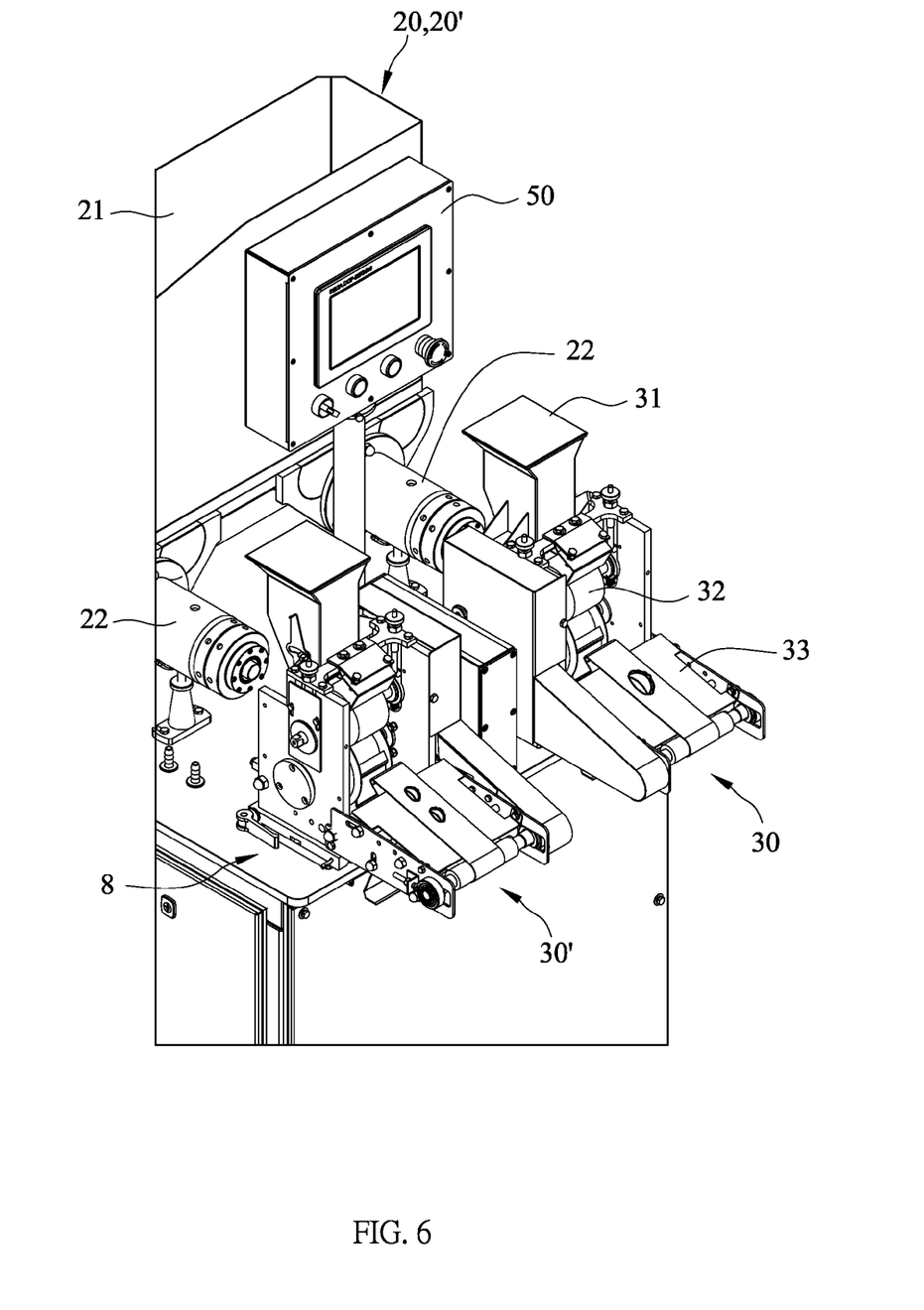
FIG. 6 is a perspective diagram showing shaping members of the dumpling wrapping device of FIG. 1.
Figure 7:
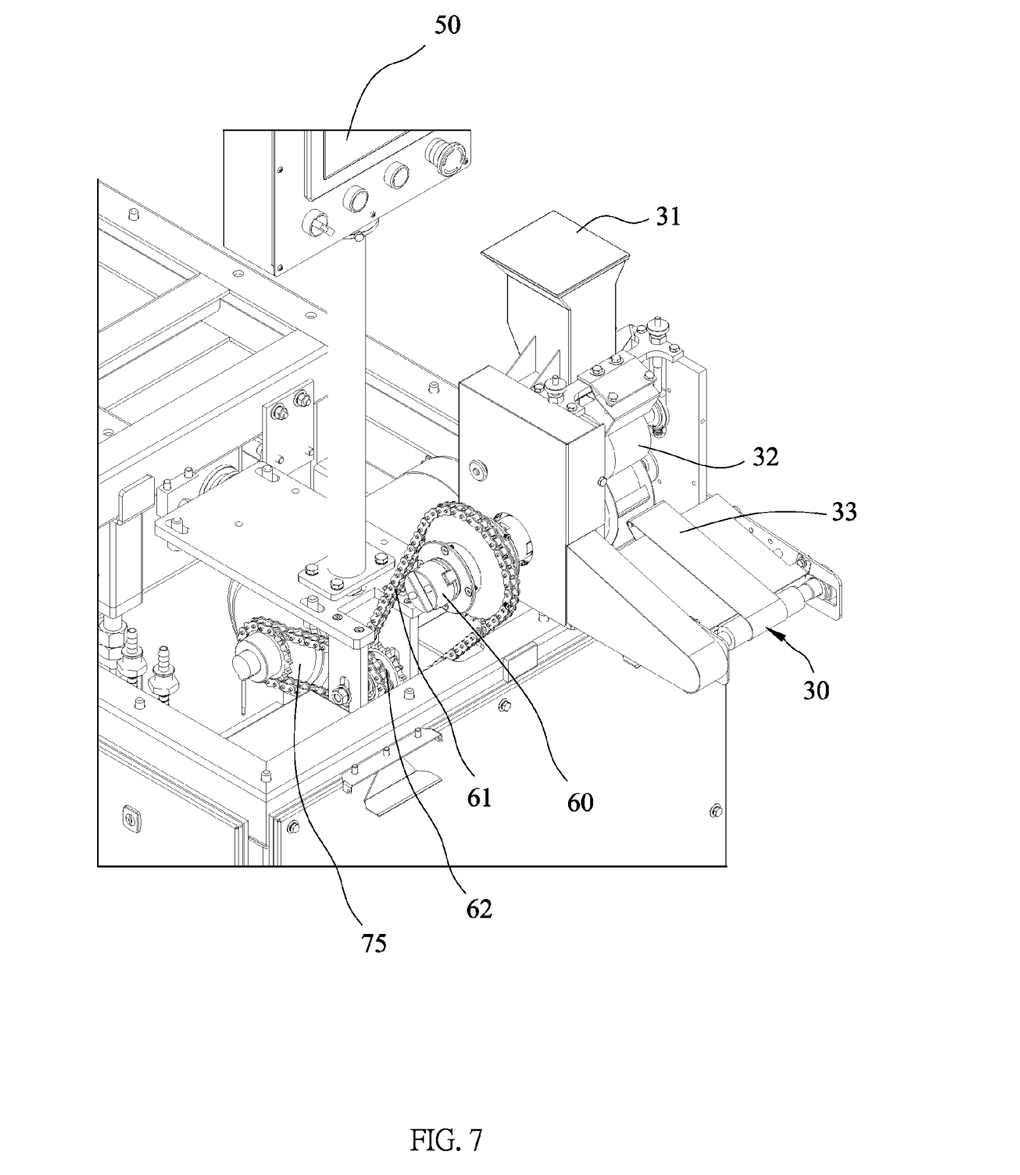
FIG. 7 is perspective diagram showing a shaping member of the dumpling wrapping device of FIG. 1 driven by a power source through a transmission element.

As shown in FIGS. 1, 6, and 7, each shaping member 30 or 30' contains a bin 31, a molding wheel 32, and a conveyer assembly 33, arranged in this order from top to bottom. The two wrapped tubes of fillings 90 (as shown in FIG. 5) are pressed by the molding wheels 32 into, for example, individual dumplings. The dumplings are dropped onto the conveyer assembly 33 and then collected. An axle 60 runs laterally through the shaping members 30 and 30', and engages the molding wheels 32. The axle 60 is driven by a transmission element (e.g., chain) 61 connected to a power source 75. Therefore, a single power source 75 is capable to drive the molding wheels 32 of the two shaping members 30 and 30', enhancing the efficiency of the dumpling wrapping device. If the transmission element 61 is a chain, an idle wheel 62 can be optionally configured to improve the reliability of the transmission element 61.

Figure 14:
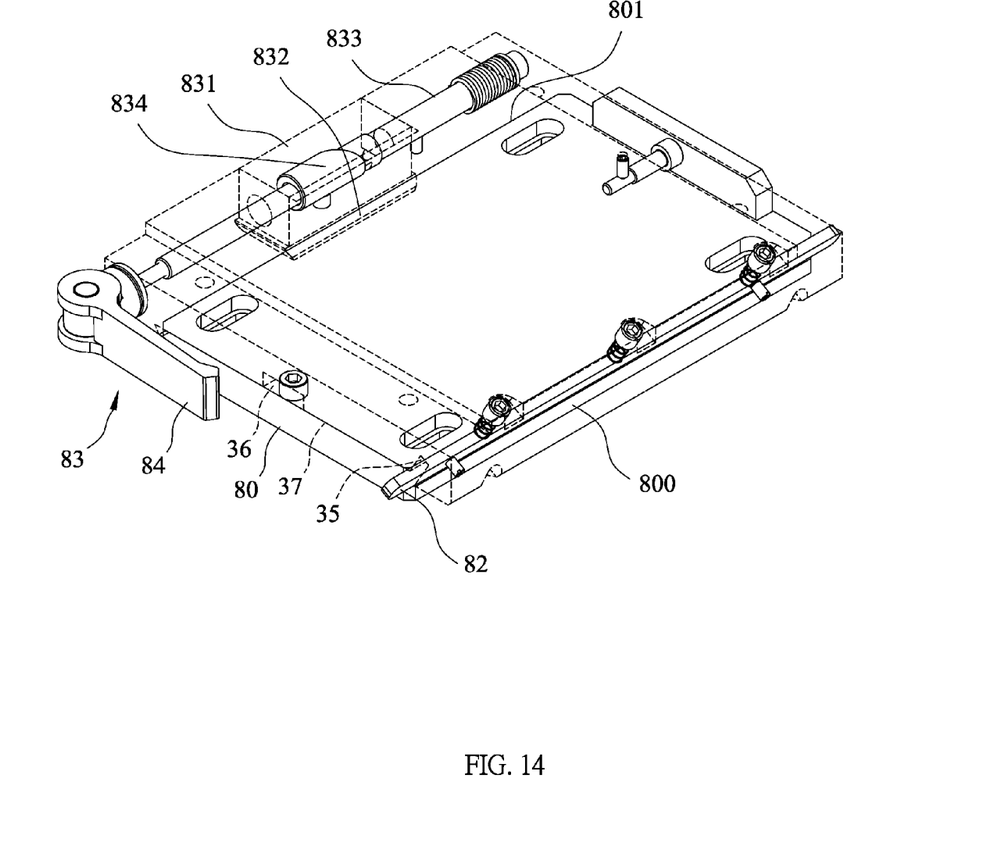
FIG. 14 is a schematic perspective diagram showing another positioning member of the dumpling wrapping device of FIG. 1.

Various molding wheels 32 can be installed to produce dumplings of different kinds of shapes and sizes. As shown in FIGS. 1, 6, and 14, a seat 34 is configured beneath each shaping member 30 or 30'. On a bottom side of each seat 34, there is an indentation 37, a guiding duct 36 above the indentation 37, and a slant trough 35 along a front edge of the indentation 37, all along an X-X direction shown in FIG. 1 and providing fast installation and replacement of a positioning member 8.

Figure 8:
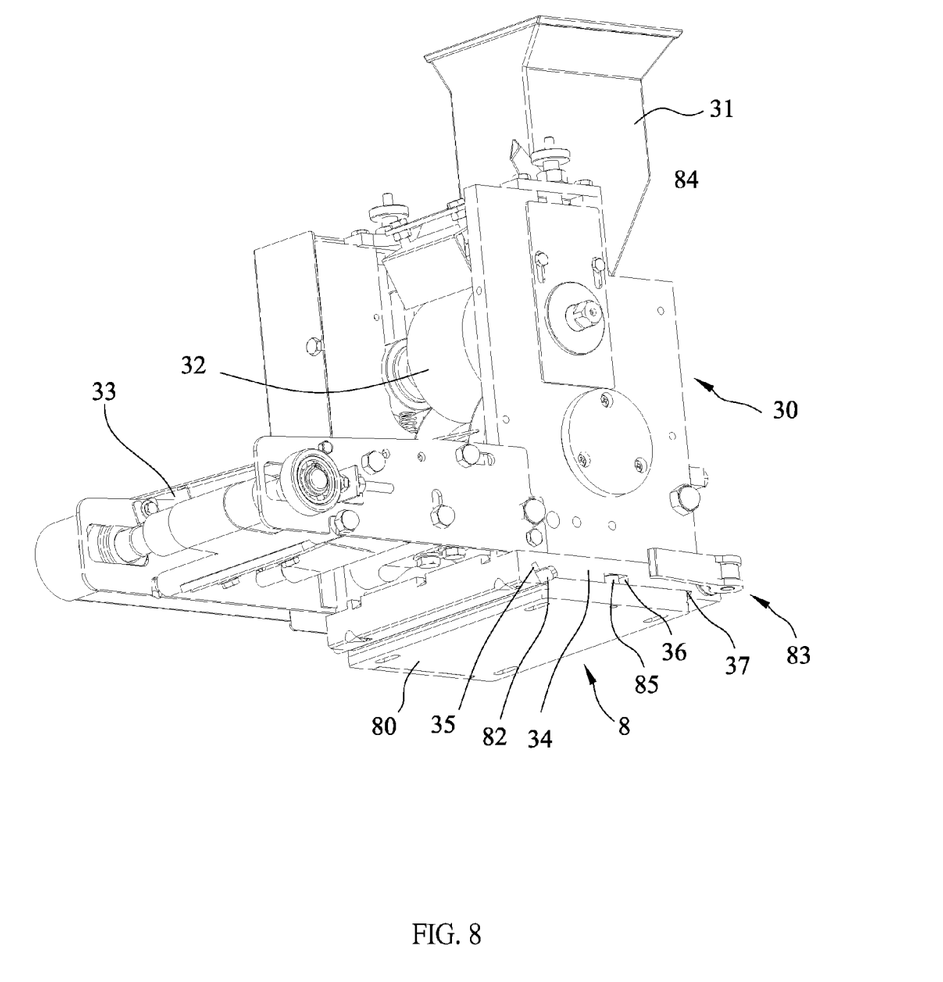
FIG. 8 is a perspective diagram showing a shaping member of the dumpling wrapping device of FIG. 1.
Figure 9:
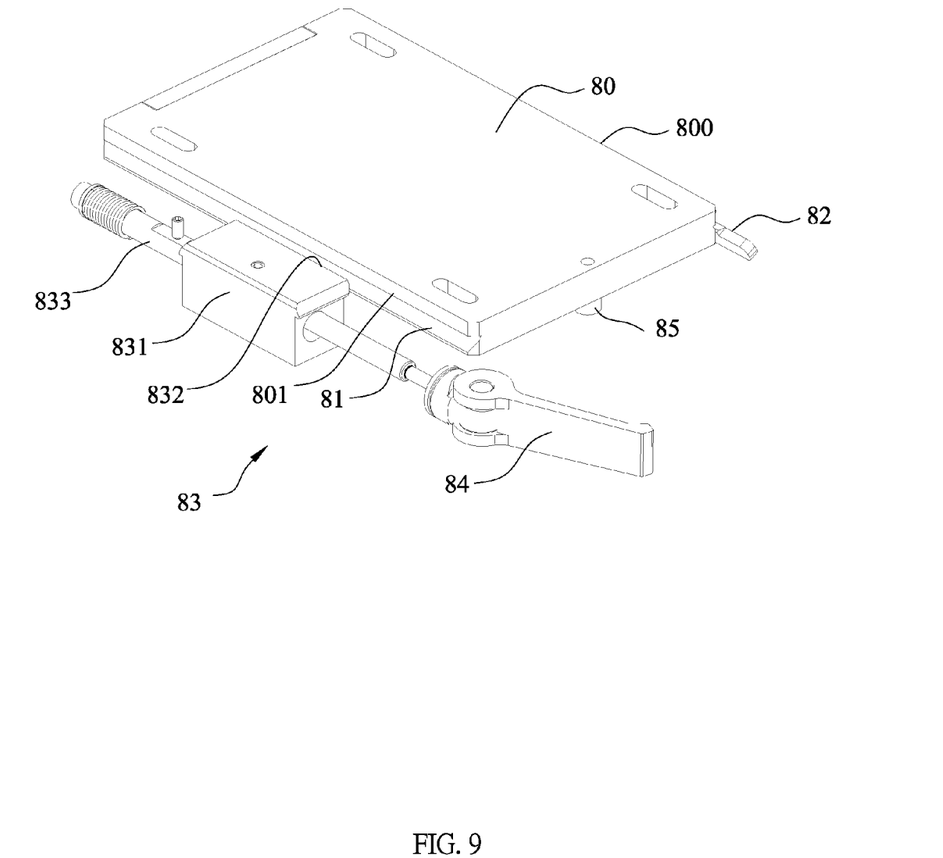
FIG. 9 is a perspective diagram showing a positioning member of the dumpling wrapping device of FIG. 1.
Figure 10:
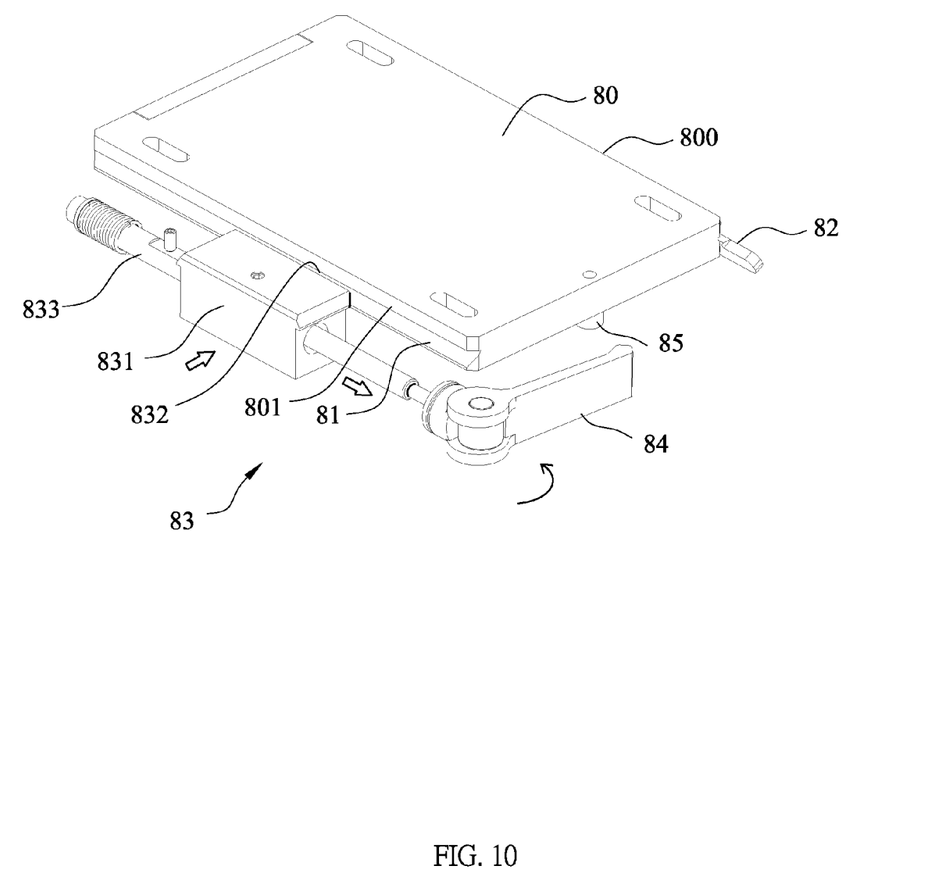
FIG. 10 is a perspective diagram showing the positioning member of FIG. 9 from a different angle.
Figure 12:
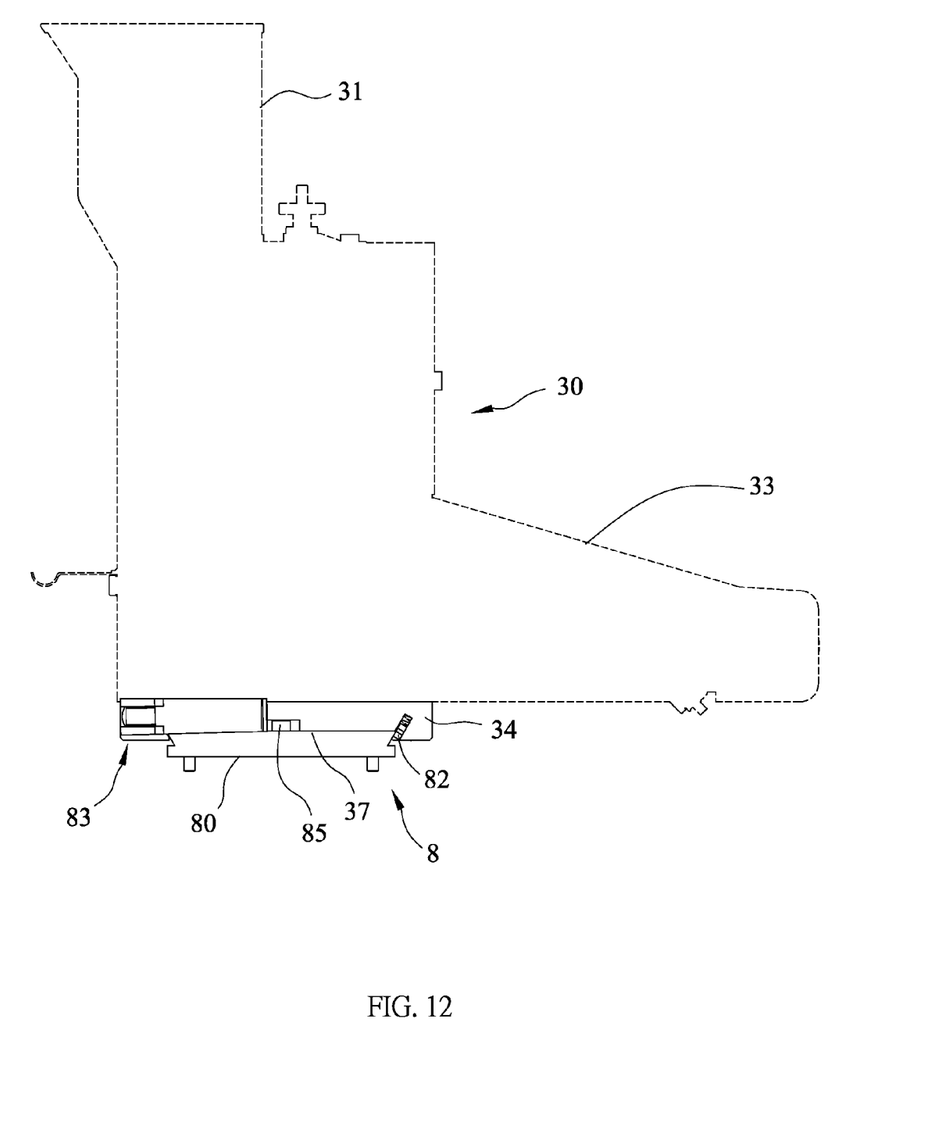
FIG. 12 is a profile view diagram showing a base of the positioning member of FIG. 9 joined to a seat of a shaping member.
Figure 13:
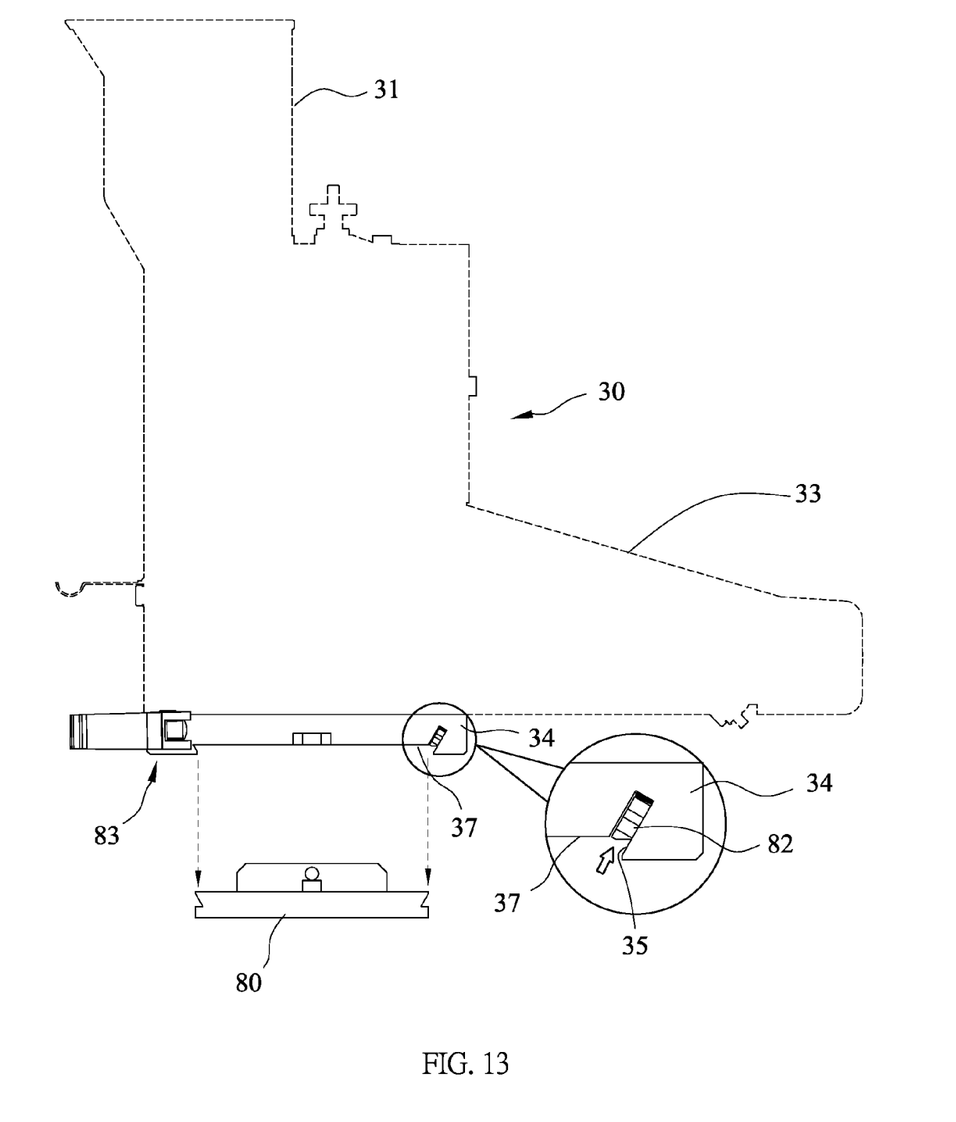
FIG. 13 is another profile view diagram showing the base and the seat of FIG. 12 when they are dismantled.

What is depicted in FIG. 14 is a positioning member 8 beneath the shaping member 30' as shown in FIGS. 1 and 6. FIG. 8 provides a perspective view to another positioning member 8 under the shaping member 30 as shown in FIGS. 1 and 6. FIGS. 9 and 10 provide another perspective view to the latter from a different angle. Each positioning member 8 contains a base 80. On a lateral edge of the base 80, a protrusion 85 is configured that is received by the guiding duct 36 of a seat 34 (as shown in FIG. 1). A slant piece 82 is configured in the slant trough 35 and is sustained by at least a spring (not numbered) so that the slant piece 82 can bulge out of the slant trough 35 in front of a front edge 800 of the base 80. As such, the bulged slant piece 82 can prevent the base 80 from falling out of the indentation 37. When the slant piece 82 is depressed as shown in FIGS. 12 and 13, the seat 34 and the base 80 can be quickly separated. As shown in FIGS. 9, 10, and 14, the base 80 has a slant back edge 801 opposite to the edge 800. The slant back edge 801 and the slant piece 82 jointly support the seat 34 in the indentation 37. Along the edge 801, a pressing member 83 is configured inside the base 80. The pressing member 83 contains a sliding block 831, a pressing element 832 beneath the sliding block 831 and against the edge 801, a shaft 833 penetrating through the sliding block 831, and a handle 84 at an end of the shaft 833. A pushing element 834 is configured on the shaft 833 at the location of the sliding block 831. When the pushing element 834 is turned along with the shaft 833 when engaged by the handle 84, the sliding block 831 is driven to move aside. The pushing element 834 is the same as the prior art and its detail is omitted. As shown in FIGS. 9, 10, and 14, when the handle 84 is turned, the pressing element 832 presses against or moves away from the edge 801. When the pressing element 832 moves away from the edge 801, the base 80 can be adjusted towards the guiding duct 36 of the seat 34. In other words, the base 80 is adjusted along the X-X direction marked in FIG. 1. Therefore, when replacing a shaping member 30 or 30', it can be quickly adjusted to the most appropriate location.

As shown in FIGS. 1, 2, and 11, the filling provision member 10, the two wrapping members 20, 20', and the two shaping members 30, 30' are controlled altogether by a control system 50. The filling provision member 10 distributes the dumpling fillings to feed two production lines, each involving a wrapping member 20 or 20' and a shaping member 30 or 30'. The two production lines can quickly produce dumplings in parallel with totally only six power sources (e.g., transmission motors), which is the most optimal design. There are three power sources 70, 71, and 72 for the filling provision member 10 (one for the mixer and two for the rotors), two power sources 73 and 74 beneath the wrapping members 20 and 20', respectively, and a single power source 75 for both shaping members 30 and 30', therefore achieving reduced power consumption.

A conventional dumpling wrapping device provides a single production line and an operator can operate at most two dumpling wrapping devices and therefore at most two production lines. In contrast, each dumpling wrapping device of the present invention provides two production lines and an operator therefore can operate two devices and up to four production lines. The yield is as such doubled yet under identical manpower, effectively reducing the production cost.

For each production line, two rotors are used to provide uniform and effective push to the dumpling fillings and the production of the dumplings is more reliable with enhanced production speed.

According to the present invention, the dumpling wrapping device provides two lines of dumpling production, each capable of integrating with a different shaping member so that different types of dumplings can be produced simultaneously. The present invention therefore can produced different products within a same interval, achieving reduced production time, power consumption yet with greater flexibility.

According to the present invention, adjustment seats are configured under the shaping members. After replacing a shaping member or when precision of the dumpling wrapping device is compromised after a long period of usage, the dumpling wrapping device can be adjusted immediately without dismantling the entire device, making the dumpling wrapping device of the present invention more convenient in assembly, maintenance, and adjustment.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A dumpling wrapping device comprising:
a filling provision member comprising a bucket with a mixer inside for storing and mixing dumpling fillings, and a provision box beneath the bucket, where a first chamber, a second chamber, and a third chamber are configured inside the provision box, the mixer has an axle extended into the first chamber, the second and third chambers are configured with pairs of grinders, respectively, the second the third chambers have outlet holes connected to two tube, respectively, for transmitting dumpling fillings;
two wrapping members beneath and connected to a dough barrel, each wrapping member comprising a pipe, a channel inside the pipe connected to one of the tubes, a helical shaft inside the channel, where, when the helical shaft is rotated, dumpling fillings from the tube are moved through the pipe while dough from the dough barrel wraps around the dumpling fillings; and
two shaping members, each comprising a bin, a molding wheel, and a conveyer assembly, arranged in this order from top to bottom, a wrapped tube of fillings from a pipe is pressed by the molding wheel into individual dumplings, and the dumplings are dropped onto the conveyer assembly and then collected.

2. The dumpling wrapping device according to claim 1, wherein the first, second, and third chambers are positioned into a triangular shape where every two of the cavities are adjacent.

3. The dumpling wrapping device according to claim 1, wherein an axle runs laterally through the shaping members; and the axle is driven by a transmission element connected to a power source.

4. The dumpling wrapping device according to claim 1, wherein a seat is configured beneath each shaping member; on a bottom side of each seat, there is an indentation, a guiding duct above the indentation, and a slant trough along a front edge of the indentation; a positioning member is movably configured in each indentation, the positioning comprises a base; on a lateral edge of the base, a protrusion is configured that is received by the guiding duct of a seat; a slant piece is configured in the slant trough and is sustained by at least a spring so that the slant piece bulges out of the slant trough in front of a front edge of the base; as such, the bulged slant piece prevents the base from falling out of the indentation; when the slant piece is depressed, the seat and the base are quickly separated; the base has a slant back edge opposite to the slant piece; the slant back edge and the slant piece jointly support the seat in the indentation; along the slant back edge, a pressing member is configured inside the base; the pressing member comprises a sliding block, a pressing element beneath the sliding block and against the slant back edge, a shaft penetrates through the sliding block, a handle at an end of the shaft; a pushing element is configured on the shaft; when the pushing element is turned along with the shaft when engaged by the handle, the sliding block is driven to move aside; when the handle is turned, the pressing element presses against or moves away from the slant back edge; when the pressing element moves away from the slant back edge, the base can be adjusted towards the guiding duct of the seat.

5. The dumpling wrapping device according to claim 1, further comprising a control system controlling the filling provision member, the two wrapping members, and the two shaping members.

6. The dumpling wrapping device according to claim 1, wherein the mixer of the filling provision member is driven by a power source; and each pair of grinders is driven by a separate power source.

* * * * *